Patented Jan. 16, 1940

2,186,946

UNITED STATES PATENT OFFICE 2,186,946

PREPARING LITHOGRAPHIC PLATES

William H. Wood, Bedford, Ohio, assignor to Harris-Seybold-Potter Company, Cleveland, Ohio, a corporation of Delaware No Drawing. Application February 10, 1938, Serial No. 189,829

20 Claims. (Cl. 41—41.5)

In printing in lithographic manner, the non-image areas of the plates should be ink-repellent and moisture receptive. It is furthermore an important desideratum that any treatment of the plates for such purpose should not involve substances which will adversely affect the image areas or their receptiveness to ink. In my patent application Serial No. 148,564 I have set forth an improved treatment of such plates, with acrylic acid or alkylated derivatives thereof, such as alpha methyl acrylic acids, or their salts, polymerized and water-soluble or dispersible. I have found that excellent results may be attained also by other compositions having certain chemical and physical characteristics in common with those just mentioned, and greatly facilitating the practice of lithography.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The plate to be used, for instance of zinc or aluminum, may be prepared by any of the various methods commonly employed in making lithographic plates. For example it may be prepared by hand transfer methods, by applying tusche or crayon to the plate, by deep etch methods, or by the procedures commonly used in photolithography. Such plates are characterized by having their image and non-image areas in substantially the same plane, that is, the plane of the surface of the plate, the image areas being kept ink receptive and the non-image areas being kept moist so as to be ink repellent. To maintain the non-image areas moist it is customary before printing to apply an etching solution to clean these areas and render them moisture receptive and during printing to continually apply, by means of a water fountain, a dampening fluid. For such solution to treat the non-image portions to render them receptive to water, and for conditioning the plate during the printing, I apply a water-dispersible polymeric carboxylic acid product. Materials which are suitable appear generally to have colloidal properties, their degree of polymerization being above that which would allow too much etching or attack of the surface of the plate, and the degree of polymerization is not so high as to preclude the material being spread evenly on the surface of the plate without clumping or agglomerating in non-uniform coating. Without confining myself to any theory, I may suggest that there is reason for believing that carboxyl groups of the molecule enter into chemical reaction with the metal of the plate and become bonded thereto, and since there are numerous carboxyl groups in each molecule of the acids there are two possible conditions which may exist, viz. either, one or at most a few such groups may react with the plate, or all or nearly all such groups may so react. Where one or only a few of the carboxyl groups become bonded to the plate these may be at the end of the molecule by polarity and the other groups of the chain may be free, thus the surface of the plate becoming covered with molecules in effect standing on end attached to the plate, and the un-attached groups of such molecules may then form a network among themselves or may form a layer of adjacent unconnected molecules. In case all or nearly all of the carboxyl groups of the molecule bond to the plate, it may be that certain valence bonds between these carboxyl groups and the CH groups to which they are attached, are partly freed, with the result that carboxyl groups from other molecules may become attached to these CH groups, and the CH groups of these molecules would then be partially freed and carboxyl groups of still further molecules could unite with them, and so on, thus forming a network of mutually joined molecules. Irrespective of any theory however, the fact remains that the surface of a plate treated in accordance with the invention has a peculiar physical character. There appears to be formed a hydrophilic surface layer the feel of which is different from that of the metal. The moist face has a soapy or gelatinous feel, and is tough, thin and very moisture receptive, and is so strongly adherent as to require abrasive action to remove it. Agents applied to give this result may be polymerized carboxylic acids, as for instance polymers of vinyl-acetate-maleic acid, styrene-maleic acid, indene-maleic acid, polymerized citraconic, itaconic, and pyruvic acid, co-polymers of vinyl-acetate maleic acid, or styrene-maleic acid or indene-maleic acid with citraconic, itaconic, or pyruvic acid, and polymerized reaction products of vinyl-acetate, styrene or indene with citraconic, itaconic, pyruvic or aconitic acid, besides the polymerized acrylic acid or alkylated acrylic acids, or their salts, as I have pointed out. And for conciseness, in the claims hereinafter such compounds are designated generically as a polymerized carboxylic acid product of the character of polymerized vinyl acetate maleic acid. Since viscosity is correlated with degrees of polymerization, low viscosity being associated with low degree of polymerization and high viscosity with high polymerization, the viscosities of acids of this type are valuable indexes of their usefulness for carrying out the invention. I have found that in general to obtain the best results, polymerized carboxylic acids should have viscosity lying in the range of from 0.8 to 8.0 sec. as measured on a Stormer viscosimeter at 30° C. with 10 revolutions using a 500 gram weight.

I have further found that the desired characteristics of the surface layer formed on the plate, such as its toughness, durability, moisture receptiveness and adherence, may be enhanced by adding to the solutions of the acids mentioned, non-acid metal compounds such as alkali salts of heavy or high molecular weight metals, as for example sodium uranate, sodium tungstate, and sodium molybdate, and compounds of thorium, such as thorium hydroxide. Although various concentrations of these nonacid heavy metal compounds or salts may be used, I have found that concentrations between 0.1 and 1 per cent are preferable.

The polymerized acid compound, in proper viscosity, is applied to the lithographic plate in manner customary in handling plates for other purposes, as, for example, by bathing, flowing or rubbing the plate with a solution of the compound; and during the printing operation application of the same, usually in lower dilution, may be made for dampening, as required. It will be understood that the concentration of the polymeric product is not critical, and ordinarily concentrations of about 1 to 10 per cent are suitable in preparation of the plates. For use in the water fountain during the printing operation, as dampening fluid, concentrations on a lower order, as for instance about 0.04 to 0.10 and up to 1 per cent are usually desirable.

This application is a continuation, in part and as to common subject matter of my application Serial No. 148,564, filed June 16, 1937.

Other modes of applying the principle of the invention may be employed, change being made as regards the details described, provided the features stated in any of the following claims, or the equivalent of such, be employed.

I therefore particularly point out and distinctly claim as my invention:

1. A process of the character described, which comprises treating a plate which is for printing in lithographic manner by applying to the metal surface a water-dispersible polymeric carboxylic acid product of the character of polymerized vinyl acetate maleic acid.

2. A process of the character described, which comprises treating a plate which is for printing in lithographic manner by applying to the metal surface a water-dispersible polymerized carboxylic acid product of viscosity 0.8–8.0 sec.

3. A process of the character described, which comprises treating a plate which is for printing in lithographic manner by applying to the metal surface a water-dispersible polymer of vinyl acetate maleic acid.

4. A process of the character described, which comprises treating a plate which is for printing in lithographic manner by applying to the metal surface water-dispersible polymerized citraconic acid.

5. A process of the character described, which comprises treating a plate which is for printing in lithographic manner by applying to the metal surface a water-dispersible polymer of vinyl acetate maleic acid with citraconic acid.

6. A process of the character described, which comprises treating a plate which is for printing in lithographic manner by applying to the metal surface a water-dispersible polymeric carboxylic acid product of the character of polymerized vinyl acetate maleic acid, and an inorganic water-soluble non-acid compound of a high molecular weight metal.

7. A process of the character described, which comprises treating a plate which is for printing in lithographic manner by applying to the metal surface a water-dispersible polymerized carboxylic acid product of viscosity 0.8–8.0 sec., and an alkali salt of a high molecular weight metal.

8. A process of the character described, which comprises treating a plate which is for printing in lithographic manner by applying to the metal surface a water-dispersible polymer of vinyl acetate maleic acid, and an inorganic water-soluble non-acid compound of a high molecular weight metal.

9. A process of the character described, which comprises treating a plate which is for printing in lithographic manner by applying to the metal surface water-dispersible polymerized citraconic acid, and an inorganic water-soluble non-acid compound of a high molecular weight metal.

10. A process of the character described, which comprises treating a plate which is for printing in lithographic manner by applying to the metal surface a water-dispersible polymer of vinyl acetate maleic acid with citraconic acid, and an inorganic non-acid compound of a high molecular weight metal.

11. A plate for printing in lithographic manner, having a metal surface carrying a deposit of a water-dispersible polymeric carboxylic acid product of the character of polymerized vinyl acetate maleic acid.

12. A plate for printing in lithographic manner, having a metal surface carrying a deposit of a water-dispersible polymerized carboxylic acid product of viscosity 0.8–8.0 sec.

13. A plate for printing in lithographic manner, having a metal surface carrying a deposit of a water-dispersible polymer of vinyl acetate maleic acid.

14. A plate for printing in lithographic manner, having a metal surface carrying a deposit of water-dispersible polymerized citraconic acid.

15. A plate for printing in lithographic manner, having a metal surface carrying a deposit of a water-dispersible polymer of vinyl acetate maleic acid with citraconic acid.

16. A plate for printing in lithographic manner, having a metal surface carrying a deposit of a water-dispersible polymeric carboxylic acid product of the character of polymerized vinyl acetate maleic acid, and an inorganic water-soluble non-acid compound of a high molecular weight metal.

17. A plate for printing in lithographic manner, having a metal surface carrying a deposit of a water-dispersible polymerized carboxylic acid product of viscosity 0.8–8.0 sec., and an alkali salt of a high molecular weight metal.

18. A plate for printing in lithographic manner, having a metal surface carrying a deposit of a water-dispersible polymer of vinyl acetate maleic acid and an inorganic water-soluble non-acid compound of a high molecular weight metal.

19. A plate for printing in lithographic manner, having a metal surface carrying a deposit of water-dispersible polymerized citraconic acid and an inorganic water-soluble non-acid compound of a high molecular weight metal.

20. A plate for printing in lithographic manner, having a metal surface carrying a deposit of a water-dispersible polymer of vinyl acetate maleic acid with citraconic acid and an inorganic water-soluble non-acid compound of a high molecular weight metal.

WILLIAM H. WOOD.